(12) United States Patent
Campbell et al.

(10) Patent No.: US 8,117,134 B2
(45) Date of Patent: Feb. 14, 2012

(54) NEUTRAL PIXEL CORRECTION FOR PROPER MARKED COLOR PRINTING

(75) Inventors: James B. Campbell, Beaverton, OR (US); Francis Kapo Tse, Rochester, NY (US); Xing Li, Webster, NY (US); David J. Metcalfe, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 521 days.

(21) Appl. No.: 12/252,391

(22) Filed: Oct. 16, 2008

(65) Prior Publication Data
US 2010/0100505 A1 Apr. 22, 2010

(51) Int. Cl.
*G06F 17/00* (2006.01)
*G06F 3/12* (2006.01)
(52) U.S. Cl. ........................ 705/400; 358/1.13
(58) Field of Classification Search .................. 705/400
See application file for complete search history.

(56) References Cited

U.S. PATENT DOCUMENTS

| | | | |
|---|---|---|---|
| 5,345,315 A | 9/1994 | Shalit | |
| 5,469,276 A | 11/1995 | Shu | |
| 5,479,584 A | 12/1995 | Curry | |
| 5,612,795 A | 3/1997 | Dichter | |
| 5,642,202 A * | 6/1997 | Williams et al. | 358/406 |
| 5,739,841 A | 4/1998 | Ng | |
| 5,828,461 A | 10/1998 | Kubo | |
| 5,845,056 A | 12/1998 | Kohler | |
| 6,035,103 A | 3/2000 | Zuber | |
| 6,057,931 A | 5/2000 | McConnell | |
| 6,115,138 A | 9/2000 | Yanaka | |
| 6,185,005 B1 | 2/2001 | Yoo | |
| 6,344,906 B1 * | 2/2002 | Gatto et al. | 358/443 |
| 6,351,558 B1 | 2/2002 | Kuwata | |
| 6,351,566 B1 * | 2/2002 | Zlotnick | 382/237 |
| 7,031,019 B1 * | 4/2006 | Sakurai | 358/1.9 |
| 7,142,733 B1 | 11/2006 | Nakagawa | |
| 7,440,138 B2 | 10/2008 | Hofman | |

(Continued)

FOREIGN PATENT DOCUMENTS

GB 2240897 8/1991

(Continued)

OTHER PUBLICATIONS

Kelly, Dwight "Ten Ways to Improve Color Management." Plant Graphics, Philadelphia: Mar. 2008, vol. 8, Iss 3, p. 34, 2 pgs.*

*Primary Examiner* — Fadey S Jabr
*Assistant Examiner* — Michael Harrington
(74) *Attorney, Agent, or Firm* — Fay Sharpe LLP

(57) ABSTRACT

A system calculates appropriate billing within an imaging pipeline. An input component receives an image that is described as a plurality of pixels. A PDL component receives the image and determines a location, a color and a designation for each of the one or more pixels. A marking engine modifies the one or more pixels based at least in part on the location and the color provided by the PDL component and places each of the one or more pixels as a monochrome or a composite pixel on a substrate. An analysis component counts the number of monochrome and composite pixels placed on the substrate by the marking engine, the number of composite pixels that include a designation are counted as monochrome. A billing component calculates the cost for placing each of the monochrome and the composite pixels counted by the analysis component.

15 Claims, 8 Drawing Sheets

U.S. PATENT DOCUMENTS

| | | |
|---|---|---|
| 2004/0119977 A1 | 6/2004 | Takahashi |
| 2005/0024669 A1* | 2/2005 | Aoki ............................ 358/1.13 |
| 2005/0151769 A1 | 7/2005 | Yeh |
| 2005/0219390 A1* | 10/2005 | Tajima et al. ................. 348/246 |
| 2005/0243341 A1 | 11/2005 | Ng |
| 2008/0088860 A1 | 4/2008 | Yoshida |
| 2008/0106569 A1 | 5/2008 | Suwa |
| 2010/0245412 A1* | 9/2010 | Page et al. ......................... 347/6 |

FOREIGN PATENT DOCUMENTS

| | | |
|---|---|---|
| JP | 2007336007 A * | 12/2007 |
| WO | WO0160051 | 8/2001 |

* cited by examiner

|  | MARKED COLOR PIXEL COUNT WITHOUT GRAY PIXEL REMOVAL | MARKED COLOR PIXEL COUNT WITH GRAY PIXEL REMOVAL |
|---|---|---|
| BELOW 1b_6 | 1.31% | 0.99% |
| BELOW 1b_5 | 1.98% | 0.72% |
| BELOW 5_4 | 3.78% | 0.56% |
| MONTH ENDING.DOC | 2.28% | 0.02% |
| TOTAL SALES.XLS | 1.59% | 0.02% |
| GRAYBKG.PPT | 16.00% | 0.12% |

*FIG. 6*

NEUTRAL PIXEL CORRECTION FOR PROPER MARKED COLOR PRINTING

BACKGROUND

The present disclosure broadly relates to printing systems and, more particularly, to designating and printing pixels within an imaging pipeline. Marking engines can override color designations for pixels in an image. In such cases, pixels designated as monochrome can instead be output as composite and billed to the customer as the same. To avoid billing for unexpected resources, such pixels are designated as gray pixels, wherein they are billed as monochrome regardless of composite conversion and output from the marking engine.

Electronic documents are utilized to record, display and transfer information. Such documents can include word processing files, graphical images, spreadsheets, and electronic mail messages. In a conventional network environment, an electronic document can be printed by selecting a print driver from a list of available print drivers within an application used to generate the document. The document is then transmitted to the marking engine corresponding to the print driver. A digital front end (DFE) application receives and processes information from the driver to print the electronic document.

The generation of a page containing imaging data (e.g., pictures, text, etc.) frequently starts at a terminal where a user generates a computer generated graphic or receives a contone image from a scanner. Image data is converted into a highly compressed form using a page description language (PDL), which is sent to a digital front end (DFE) that interfaces with a marking engine. The DFE decomposes the PDL and sends a number of separations of byte maps (e.g., cyan, magenta, yellow, and black) of contone video to one or more interface cards via a suitable protocol employed by the DFE. The PDL is expanded into separations of bit maps, wherein the resultant data is sent to the marking engine. Finally, the marking engine has an interface card which reformats the data into rasters, halftones them in a rendering card, and applies them to the raster output scanner (ROS) for printing.

An assumption can be made that a single color will be employed by the marking engine to create a hardcopy monochrome output of imaging data. In one example, it is assumed that a gray field will be output via placement of a plurality of exclusively black (K) pixels. However, for certain types of marking engines such as that used for liquid or solid ink jet printing, it is sometimes desirable to print neutral gray areas (e.g., fill, sweep, field, etc.) with composite pixels instead of monochrome to provide greater output quality. In such cases, four colors (e.g., cyan (C), magenta (M), yellow (Y) and black (K) are utilized to decrease graininess appearance. For billing purposes, however, it is undesirable to charge customers for composite pixels that were assumed to be monochrome.

What are needed are systems and methods to identify gray pixels within the imaging pipeline and remove them from billing calculations to accurately reflect customer expectations.

BRIEF DESCRIPTION

In one aspect, a system calculates appropriate billing within an imaging pipeline. An input component receives an image that is described as a plurality of pixels. A PDL component receives the image and determines a location, a color and a designation for each of the one or more pixels. A marking engine modifies the one or more pixels based at least in part on the location and the color provided by the PDL component and places each of the one or more pixels as a monochrome or a composite pixel on a substrate. An analysis component counts the number of monochrome and composite pixels placed on the substrate by the marking engine, the number of composite pixels that include a designation are counted as monochrome. A billing component calculates the cost for placing each of the monochrome and the composite pixels counted by the analysis component.

In another aspect, a method is employed to print an image on a substrate. Image information is received that includes a plurality of monochrome and composite pixels. Each pixel within the image is designated as a gray pixel and a non-gray pixel. The image information is converted into a digital format file and one or more pixels within the digital format file are modified from monochrome to composite. The file image is rendered to include the pixel modification and the plurality of pixels are placed on a substrate based at least in part upon the pixel modification.

In yet another aspect, a method is employed to accurately bill a customer for a print job. A total number of pixels placed on a substrate are counted and the number of composite and monochrome pixels placed is determined from the total number counted. A number of composite pixels are determined that are designated as gray pixels. The gray composite pixels are removed from the number of composite pixels and added to the number of monochrome pixels. The total number of composite and monochrome pixels is calculated and a customer is billed for the composite and monochrome pixels calculated.

BRIEF DESCRIPTION OF THE DRAWINGS

FIG. 6 quantifies the difference between systems with and without gray pixel identification, in accordance with an exemplary embodiment;

DETAILED DESCRIPTION

Figure 1:
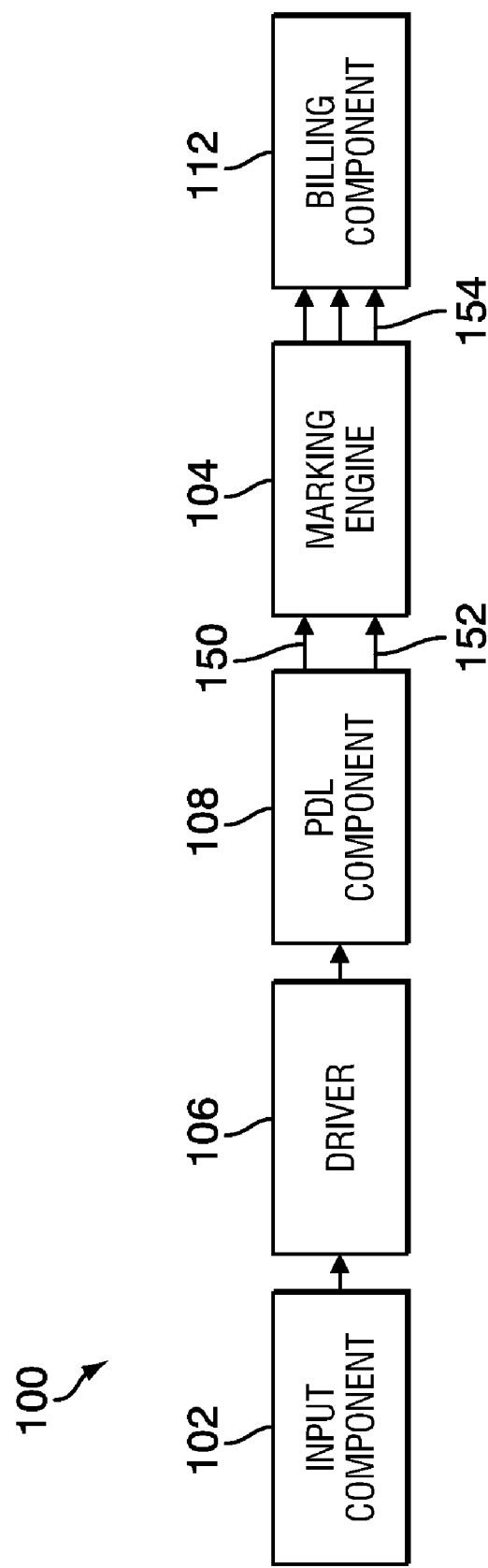
FIG. 1 is an imaging pipeline that identifies and bills pixel placement within an image in view of customer expectation, in accordance with an exemplary embodiment.

With reference to FIG. 1, an imaging pipeline 100 is illustrated that accepts and creates a hardcopy output based on entered data. An input component 102 is employed to enter data content that is sent to a marking engine 104. A device driver 106 provides a communication interface between the input component 102 and marking engine 104. A PDL component 108 receives print information from the print driver and outputs a program such as a postscript language file that describes the pixel location for the marking engine 104. A billing component 112 receives information from the marking engine 104 to provide appropriate billing for resources utilized by the marking engine 104 in view of the print data 150 and metadata 152.

Print information is communicated from the input component 102 to the PDL component 108 via the driver 106. Two sets of data are output from the PDL component 108 for use throughout the imaging pipeline 100. The PDL component 108 first receives both print data and metadata from the input component 102 via the driver 106.

The PDL component 108 parses the metadata 152 from the print data 150 as it determines the location and color of pixels to create for each print job received. The print data 150 describes the location and color of pixels for each print job. The metadata 152 describes the type of color that requested for each field within an image (text, picture, etc.) based on data entered into the input component 102. The print data 150 and the metadata 152 are communicated throughout the imaging pipeline 100 from the input component 102 to the billing component 112.

The print data 150 relates to placement and color of each pixel for each print job created at the input component 102. For example, a particular font size and type can be employed to create text for a print job. However, pixel location and color can be related to the type of content, such as a case, a symbol, a number, a letter, etc. In this manner, the print data 150 can be employed to provide instruction to each element in the imaging pipeline 100 regarding pixel placement and color to output each print job.

The metadata 152 includes assumptions as to resources employed by the marking engine 104 to output a print job. For example, an assumption can be made that gray is to be created utilizing exclusively black ink. This assumption information can be predetermined and stored in a table or memory store (not shown) for subsequent retrieval. In another example, an artificial intelligence component (not shown) can assign a predetermined assumption that is communicated as metadata for each print job. The metadata 152 can provide assumptions for each pixel within an image for each print job.

In one embodiment, the input component 102 is a computer that supports the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The input component 102 can employ an exemplary environment such as a computer that includes a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The input component 102 can further include a hard disk drive, a magnetic disk drive, e.g., to read from or write to a removable disk, and an optical disk drive, e.g., for reading a CD-ROM disk or to read from or write to other optical media. The input component 102 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the input component 102.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program non-interrupt data. The operating system in the input component 102 can be any of a number of commercially available operating systems.

A user may enter commands and information into the computer through a keyboard (not shown) and a pointing device (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc. A monitor (e.g., the display 116), or other type of display device, is also connected to the system bus via an interface, such as a video adapter (not shown). In addition to the monitor, a computer typically includes other peripheral output devices (not shown), such as speakers, printers etc.

A display can be employed with the input component 102 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from the input component 102 via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

The device driver 106 allows the processing component 102 to interface to the marking engine 104. In one aspect, the device driver 106 acts as a translator between the marking engine 104 and the applications or operating systems employed by the input component 102. In this manner, higher-level code can be written independently of the specific model of marking engine 104. The device driver 106 can convert general input/output instructions of the input component 102 to specialized messages for consumption by the marking engine 104.

In addition, the input component 102 can run a software program to invoke a routine in the driver 106, wherein the driver 106 issues commands to the marking engine 104. Once the marking engine 104 sends data back to the driver 106, the driver 106 may invoke routines in the original calling program. The driver 106 can also provide interrupt handling required for an asynchronous time-dependent hardware interface to the marking engine 104.

The communication protocols and standards of the driver 106 can vary in association with the type of marking engine 104 and input component 102. In one example, each version of the marking engine 104 can require unique specialized commands. Software applications run by the input component 102 can access the marking engine 104 by using high-level, generic commands, such as PRINTLN. The driver 106 can accept these generic statements and convert them into the low-level commands required by the marking engine 104.

The PDL component 108 receives print information from the driver 106 to produce files that are independent of any model/type of marking engine. The PDL can use a series of operators, dictionaries, arrays, stacks, paths, coordinate systems, etc. to describe bitmap images, vectors, text, and page layouts. The output of the PDL can be text-based. For example, bitmapped images and vector drawings can be converted into text coding along with font information, object location, color characteristics, page, size, etc. In this manner, complex bitmapped and vector images, page layouts, multiple fonts, etc. can be provided that is independent of type or model of the marking engine 104. In one embodiment, the PDL component 108 is included in the driver 106.

The PDL component 108 can designate pixels within each file created to designate the type of color assignment associated therewith. Information is first provided by the input component to specify the color(s) to be used by the marking engine 104 for particular content within a print job. Next, the PDL component 108 specifies, on a pixel by pixel basis, various parameters such as size, location, and color. This information is output as the print data 150 from the PDL component 108. Assumptions as to the type of resources employed to create such an output is sent from the PDL component 108 as the metadata 152. For example, a pixel with a particular assumption is designated as a gray pixel and sent as the metadata 152 throughout the imaging pipeline 100.

Each pixel within a field can be designated to indicate it is to be placed on a substrate utilizing particular resources (e.g., ink, etc.) to identify customer expectation with regard to print production. Such designation, however, is not dispositive of how a print job is actually produced. In some instances, the designation of pixels is overridden by the marking engine 104. This can be done based on an algorithm or other logic to provide greater quality imaging, resource management, etc. It is to be appreciated that pixels within an image can have a designation related to substantially any property that is reflective of a customer's expectation. This expectation provides an appropriate context to evaluate cost and resources. In this manner, appropriate billing can be provided to customers for each print job.

The PDL component 108 allows software used by the input component 102 to interface with the marking engine 104 via a page description language. In one example, a page description language can be created specifically to handle variable-data applications by sorting out static elements that are reused on each page from dynamic images that are constantly changing. The PDL component 108 can use substantially any page description language such as Variable-data Intelligent PostScript Printware, Interpress, PostScript, Printer Control Language, etc.

The marking engine 104 is representative of one or more devices that can output an image onto a substrate. In one example, the marking engine 104 is a printer such as a toner-based printer, a liquid ink jet printer, a solid ink printer, a dye-sublimation printer and an inkless printer. In one embodiment, the marking engine 104 is a toner-based laser printer that utilizes xerography to output documents. Toner is adhered to a light-sensitive print drum, wherein static electricity transfers the toner to a printing medium to which it is fused via heat and pressure. In another embodiment, the marking engine 104 is an LED printer which uses an array of LEDs instead of a laser to cause toner adhesion to a print drum.

The marking engine 104 can also be a solid ink printer that is a type of thermal transfer printer. Solid ink printers employ solid sticks of cyan (C), magenta (M), yellow (Y) and black (K) colored ink, which are melted and fed into a piezo crystal operated print head. The print head sprays the ink on a rotating, oil coated drum. The paper then passes over the print drum, at which time the image is transferred, or transfixed, to the page. In yet another embodiment, the marking engine 104 is a dye-sublimation printer that uses heat to transfer dye to a medium such as a plastic card, paper or canvas. The process generally lays one color at a time using a ribbon that has color panels. Dye-sublimation printers are intended primarily for high-quality color applications, including color photography.

In another approach, the marking engine 104 is an inkless printer that uses paper with colorless dye crystals embedded between two outer layers of paper. When the printer is turned on, heat from the drum causes the crystals to colorize at different rates and become visible. Another inkless printer approach utilizes a reusable paper coated with a few micrometers of UV light sensitive chemicals. The printer employs a UV light bar that writes and erases the paper.

The billing component 112 calculates the cost and determines the amount to bill for each print job. In some cases, the amount billed is not based strictly upon the type or amount of resources employed to create a print job. For instance, if a customer expects one particular color to be employed for a particular print field, the billing component can ignore the resources utilized and/or cost and bill the customer in association with their expectations. In some cases, the variance between customer expectation and resources employed is a matter of quality, wherein greater quality is achieved from expending more resources. In this manner, a high quality output can be created wherein the customer is billed in line with his/her expectations to facilitate a positive business relationship.

Figure 2:
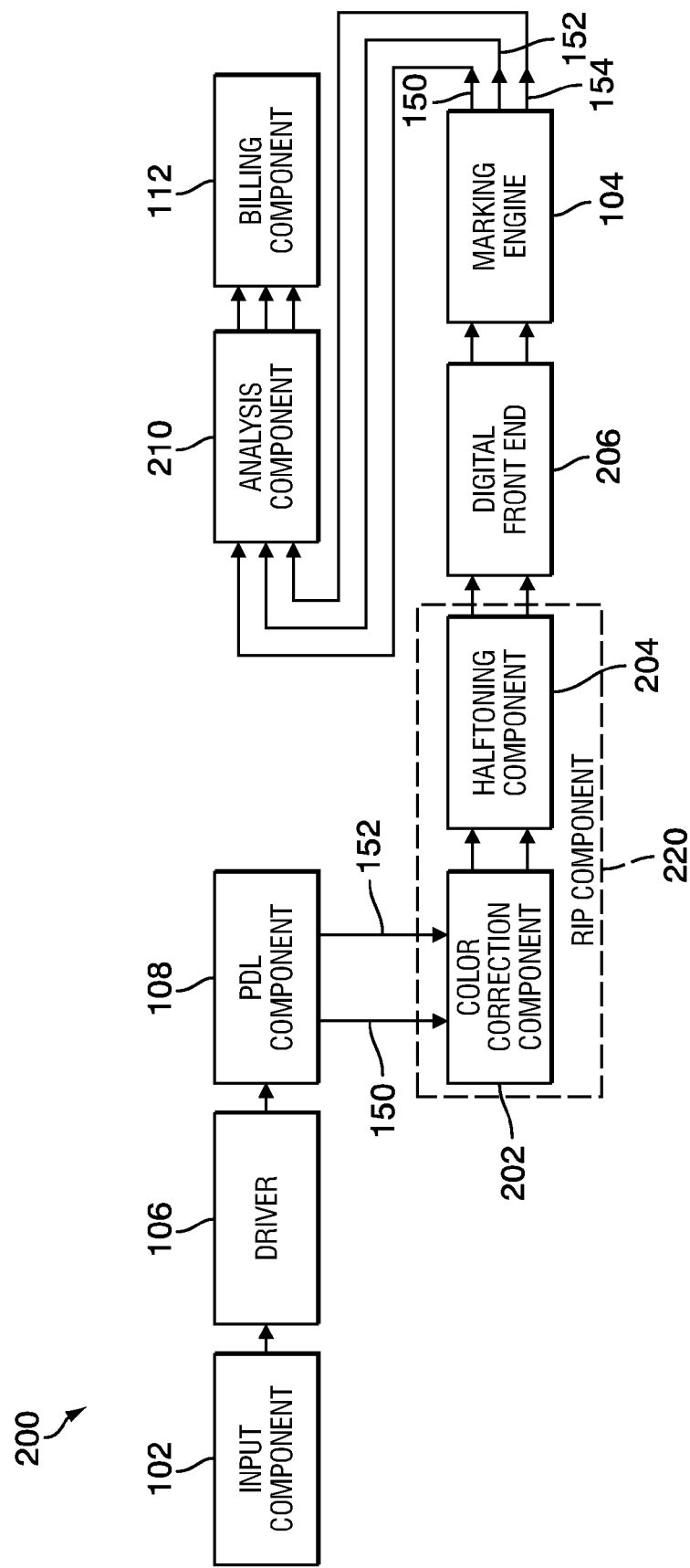
FIG. 2 is an enhanced imaging pipeline that identifies and bills pixel placement within an image in view of customer expectation, in accordance with an exemplary embodiment.

FIG. 2 illustrates an imaging pipeline 200 that includes several additional components to the system 100 described above. The print data 150 and the metadata 152 from the PDL component 108 is processed via a raster image processor (RIP) component 220, which includes a color correction component 202 and a halftoning component 204. A digital front end 206 accepts the print data 150 and metadata 152 from the halftoning component 204 for processing by the marking engine 104. An analysis component 210 reviews the print data 150, the metadata 152 and resources employed by the marking engine 104 (resource data 154) to provide contextual cost information to the billing component 112.

In one example, the imaging pipeline 200 creates documents via digital printing utilizing four colors, cyan (C), magenta (M), yellow (Y), and black (K). Such printing is referred to as utilizing a CMYK color model. The color correction component 202 and halftoning component 204 evaluate the print data from the PDL component 108 to determine if any modifications to color assignments and/or pixel placement need to occur. The purpose is to convert an electronic image generally presented in a red-green-blue (RGB) color space to an equivalent CMYK color representation.

For example, a conversion can utilize color profiles that describe the spaces being converted. Transforming profiled color information to different marking engines is achieved by referencing the profile data into a standard color space. By ensuring that the reference color space includes colors visible to humans, the color correction component 202 and the halftoning component 204 allow an exchange of colors between a plurality of different marking engine types.

The RIP component 220 produces a raster image (e.g., a bitmap) based on vector digital information (e.g., data 150 and 152) from the PDL component 108. In one example, the input received by the RIP component 220 is a page description in a high-level page description language such as PostScript, Portable Document Format, XPS or another bitmap of higher or lower resolution than the output device. In the latter case, the RIP component 220 can apply color correction and/or halftoning to the input information via the color correction component 202 and the halftoning component 204 to generate the output bitmap.

The PDL component 108 describes the image to be output via a plurality of pixels. The color correction component 202 can treat each overlap of color pixels as one of eight (combinations of CMY) or of sixteen (combinations of CMYK) colors. The color correction component 202 evaluates the resultant color as an area-weighted colorimetric combination of these primary colors. In this manner, the color correction component 202 can modify print parameters received from the PDL component 108 to account for dot gain of scattered light between and within the areas of pixels. Such evaluation is facilitated via known formulas that consider dye combination, absorption spectra, empirical parameters, etc.

The halftoning component 204 receives information from the color correction component 202 to allow for less than full saturation of the primary colors, wherein pixels of each primary color are printed in a pattern small enough that human beings perceive a single color. Magenta printed with a twenty percent halftone, for example, produces a pink color, because the eye perceives the tiny magenta dots and the white paper between the dots as lighter and less saturated than the color of pure magenta ink.

Without halftoning, the three primary process colors (cyan, yellow, and magenta) could be printed only as solid blocks of color, and therefore could produce only six colors: the three primaries themselves, plus three complementary colors produced by layering two of the primaries—cyan and yellow produce green; cyan and magenta produce a purplish blue; yellow and magenta produce red (these subtractive complementary colors correspond roughly to the additive primary colors). The halftoning component 204, however, allows a full continuous range of colors to be produced.

The halftoning component 204 can use a high frequency/low frequency dichotomy to determine which pixels to turn on or off. A raster image or bitmap within which each monochrome pixel may be on or off (e.g., ink or no ink). To emulate a photographic halftone cell, the digital halftone includes groups of monochrome pixels within the same-sized cell area. The fixed location and size of these monochrome pixels compromises the high frequency/low frequency dichotomy of the photographic halftone method.

Clustered multi-pixel dots cannot "grow" incrementally but in jumps of one whole pixel. In addition, the placement of that pixel is slightly off-center. To minimize this compromise, the digital halftone monochrome pixels must be quite small, numbering from 600 to 2,540, or more, pixels per inch. Further, the halftoning component 204 can employ additional dithering algorithms to decide which pixels to turn black or white to yield optimal results.

The digital front end 206 provides an interface for information from the halftoning component 204 to the marking engine 104. Although the marking engine 104 is shown as a single component, it is to be appreciated that a plurality of marking engines can be represented by the marking engine 104 to interface with a digital front end 206. Additionally, one or more digital front ends 206 can be employed to interface to the one or more marking engines 104. For example, a single DFE can be employed to drive one dedicated marking engine. The marking engine 104 can be a copier, a printer, an imagesetter, a digital press, or substantially any device that creates an image on a substrate. In the case of a printer, the marking engine 104 can be a color laser printer, a production printer, etc. as described above.

A production printer or other high speed marking engine is generally more expensive to operate with a higher cost-per-page than standalone office printers. Generally, vendors assign a plurality of "click charges" to each job received, wherein the number of "click charges" increase when a color page(s) is printed within a job. In one example, a color page can have six times the number of associated "click charges" as an identical monochrome (e.g., black (K)) page. In view of this disparity, it is important to maintain billing practices that conform to customer expectations and not to bill for quality enhancements that are made based on an algorithm within the imaging pipeline 200.

The digital front end 206 serves as a control point to provide control over the marking engine 104. As discussed above, the first point of control is provided through the driver 106. By making the driver 106 available at one or more locations, users can review the capabilities of the marking engine 104 and select desired options. For example, users can select duplex printing or collation for documents that require these features, to minimize the use of paper or manual finishing.

In order to allow high-speed printers to operate at a maximum speed, the digital front end 206 organizes print data received from the input component 102 and the driver 106 for consumption by the marking engine 104. In this manner, the digital front end 206 can accommodate the complexity of page layout and leave production to the marking engine 104, shielding it from the page manipulation.

Data, such as a twelve page paper or a twelve page booklet, received by the marking engine 104 is processed in the same manner and thus can slow output speed. To relieve the marking engine 104 of expending data processing resources, the DFE 206 can position the pages in the booklet on appropriate sheets of paper and add a cover from a previous job. The DFE 108 is responsible for assembling necessary images and building data-driven graphics in situ so that the marking engine 104 receives a fully composed document. The marking engine 104, without the DFE 108 providing data organization and assembly, is unable to approximate printing at a maximum rated speed.

The DFE 108 can also be selected based on various criteria such as throughput, volume of pages, marking engine types, etc. For example, generating thousands of pages on high-speed marking engines will require disparate control from generating the same via clusters of mid-range printers. Clustering is a technique that divides a large print run across multiple marking engines simultaneously to achieve very high print speeds.

In one example, the DFE 108 supports up to twelve marking engines, including non-color (e.g., black (K)) and color marking engines. When a non-color document is recognized, the DFE 108 assigns the job to a non-color printer. Alternatively, when a color document is recognized, the DFE 108 can add a color printer. In this manner, the DFE 108 can optimize the print resources within a system to accommodate and output both non-color and color documents.

In another example, the DFE 108 communicates with marking engine clusters of ten non-color and two color marking engines. The DFE 108 can perform load balancing across the different marking engines. The DFE 108 can track marking engines and route work to idle marking engines or send copies of the same job to multiple marking engines, if the job calls for more than one copy. In this manner, a print job can be completed efficiently.

The print data 150 and metadata 152 are sent along the imaging pipeline 200 from the input component to the marking engine 104. The marking engine 104 utilizes the print data 150 to accurately output the print job received. The metadata 152 includes gray pixels that identify one or more resources expected to be utilized. The metadata 152 does not, however, affect the resources employed by the marking engine 104 to output a print job. Lastly, resource data 154 related to resources utilized by the marking engine 104 is sent along with the print data 150 and the metadata 152 to the analysis component 210.

The resource data 154 describes the ink type, color, etc. employed by the marking engine 104 to output the print job on a substrate. For example, a black field described via the print data 150 can be created by the marking engine 104 utilizing composite pixels that include a plurality of colors such as cyan, magenta, and yellow as well as black. Additional colors can be employed to create higher quality output. Within the CMY color space, any hue angle can be achieved by combining two of the three primaries. The intention of the third color is to move that hue towards grey (decrease saturation), and is known as the graying agent. However, as that graying agent has an inherent hue of its own, it also shifts the hue as it changes the saturation of the resulting color.

The most efficient way to change the saturation of a given color while maintaining the same hue angle is to use the black (K) component. Accordingly, the CMY values that add to grey all along the tone scale can be replaced with black ink. Thus, the marking engine 104 can utilize colors not necessarily included in the print data 150 to create documents. It is this differentiation that is evaluated since conventional imaging pipelines do not distinguish between print data (e.g., sent from an input component to a marking engine) and the resources actually employed by the marking engine.

The analysis component 112 compares the output requested via the print data 150, the resources expected via the metadata 152 and the resource data 154 that includes the materials such as ink color, type etc. expended by the marking engine 104. The metadata 152 includes gray pixels that provide a designation of the type of resources expected to be employed by the marking engine 104 to output each print job.

This comparison provides contextual print information for document creation within the imaging pipeline 200 to allow intelligent decision making related to costs and billing for such costs. The analysis component 210 and the billing component 112 are located downstream from the marking engine 104 since the resources cannot be evaluated until a hardcopy output is created and associated resources are expended.

In one example, the analysis component 210 counts the number of monochrome and number of composite pixels placed by the marking engine 104. The composite pixels can include both gray pixels and non-gray pixels. If so, the analysis component 210 counts the gray pixels as monochrome pixels instead of composite pixels. The analysis component 210 can use any number of algorithms, strategies, etc. to evaluate the three data sets. These algorithms can relate to the amount of disparity allowed to bill a customer a first amount instead of a second (e.g., more expensive) amount. In one embodiment, this information is provided to the billing component 112 for appropriate cost information generation that charges monochrome pricing for gray pixels.

Figure 3:
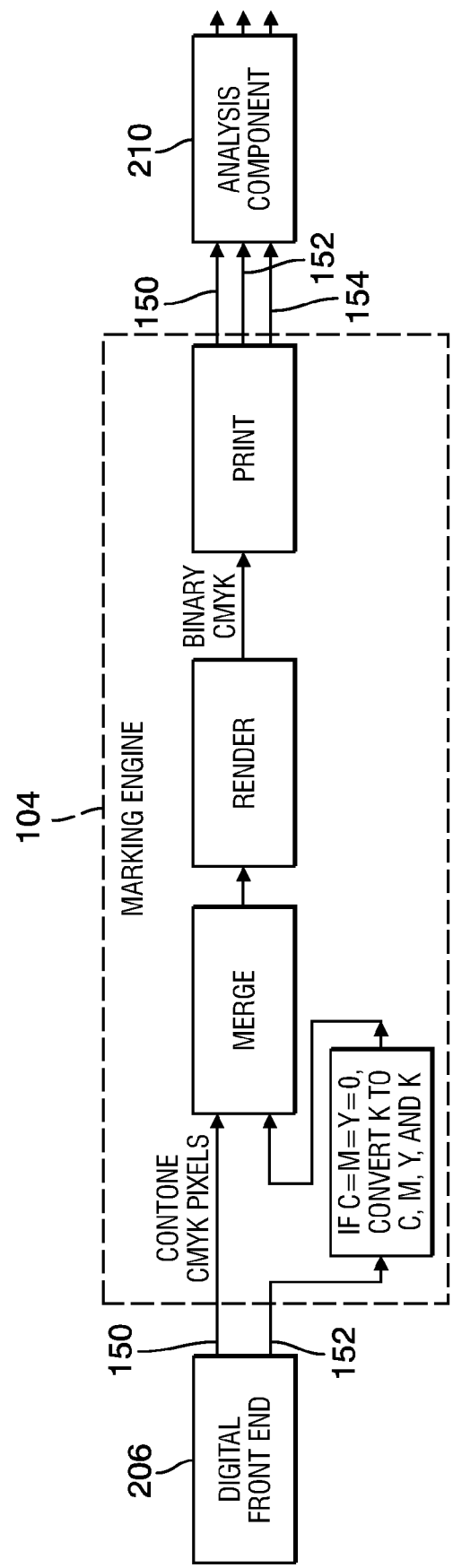
FIG. 3 is a system that places and counts the number of rendered pixels on a substrate, in accordance with an exemplary embodiment.

FIG. 3 illustrates printing via the marking engine 104 based on the data 150 and the metadata 152 received from the digital front end 206. The resource data 154 is output from the marking engine 104 and evaluated along with the data 150 and the metadata 152 by the analysis component 210. The marking engine 104 receives two data streams from the digital front end 206: the print data 150 and the metadata 152. The marking engine 104 evaluates the metadata 152 to identify the color assigned to each pixel.

If there is no color assigned (e.g. C=M=Y=0), the marking engine 104 modifies pixels that are designated as black (K) only to include the C, M, and Y colors. The marking engine 104 performs this conversion in order to provide a higher quality such that the coloration placed on the substrate appears to have a deeper and/or richer color output. The data stream 150 designates the location of each of the pixels when within each print job. The two data streams are merged and the marking engine 104 renders a final image in a binary CMYK format before printing.

The analysis component 210, placed downstream from the marking engine and the print operation, receives the print data 150, the metadata 152, and the resource data 154 from the marking engine 104. The analysis component 210 counts the number of pixels within each print job that were placed on the output substrate. The pixels can be counted within specific categories such as composite and monochrome, wherein composite refers to a plurality of colors and monochrome refers to a single color utilized to form a pixel.

In one embodiment, the analysis component 210 counts the number of C, M, Y, and K pixels placed by the marking engine 104. The analysis component 210 can also count marked color pixels exclusively and/or in addition to marked pixels which would include C, M, or Y pixels. The analysis component 210 can also count marked composite pixels which can include C and M and Y but not black (K) pixels. In this manner the analysis component 210 can count the number and type of pixels that were placed and printed by the marking engine 104 for billing purposes.

Figure 4:
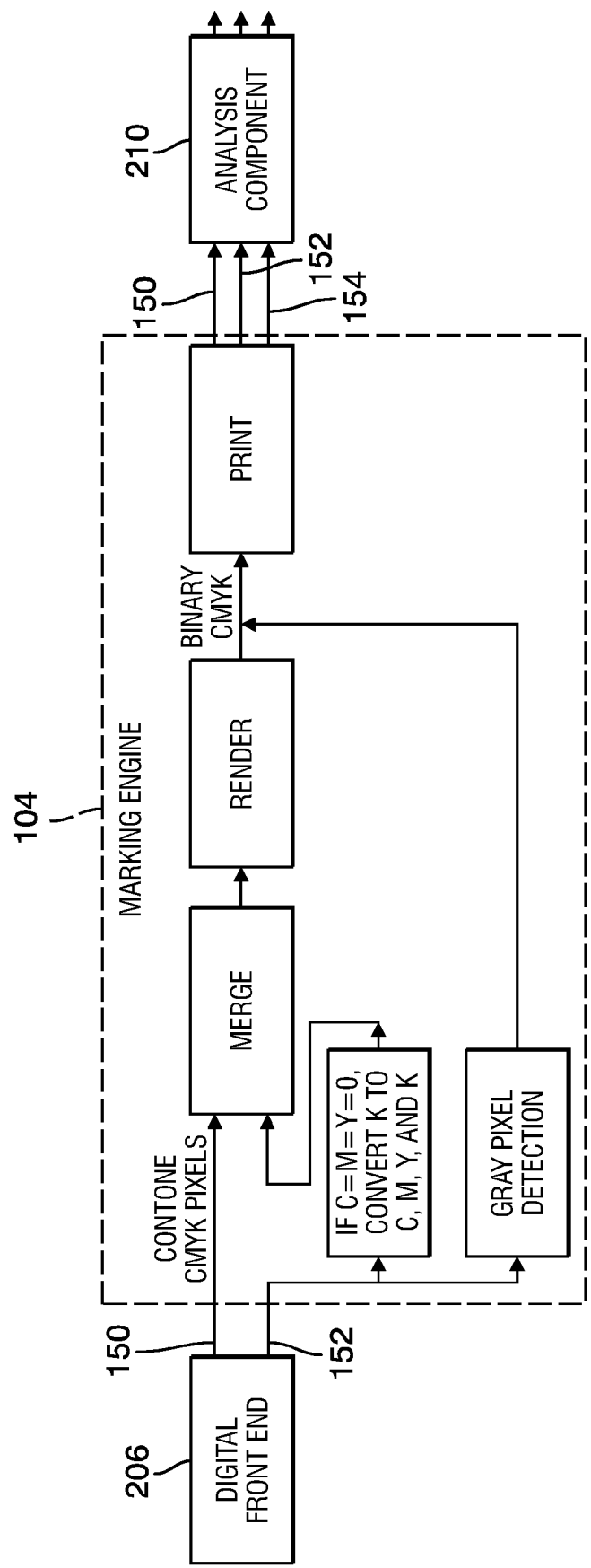
FIG. 4 is a system that counts the number of rendered pixels and gray pixels placed on a substrate, in accordance with an exemplary embodiment.

FIG. 4 illustrates the marking engine 104 that further includes gray pixel detection that is not employed in FIG. 3. The analysis component 210 counts the number of gray pixels, if any, to provide to the billing component to count as a monochrome instead of composite type of pixel for billing purposes. In this manner, each print job (and pixel printed therein) can be billed according to resources utilized in view of customer expectations.

The data stream 152 is received by the marking engine to review whether a designation of C M or Y has been provided somewhere upstream in the imaging pipeline 200. Further, the marking engine 104 evaluates whether any of the pixels for each print job have a gray pixel designation. If such a designation exists, the customer has indicated that they wish that pixel(s) to be marked with an exclusively black color ink. It is to be appreciated, however, that the gray pixel designation does not affect the manner in which the marking engine 104 renders each incoming image since gray pixel detection does not reenter the data stream until after the rendering process has been complete.

Once the rendering process is complete, the gray pixel detection data is sent along with the rendered image data to be printed and through to the analysis component 210 for counting purposes. In this embodiment, the analysis component 210 counts the C M Y and K marked pixels as well as any marked neutral pixels C and M and Y. The analysis component 210 also evaluates any gray pixels that have been designated and removes them from calculating numbers of color pixels that have been marked by the marking engine 104. In this manner, pixels designated as gray pixels are not charged for color printing even if such color ink was utilized.

In the case where the CMYK pixels were generated such that the gray pixels are guaranteed such that the CYMK values contain only K values (C=M=Y+0 and the K equals gray value), the gray detection would just detect and mark the pixels that meet all the criteria. It is to be appreciated that the gray pixel detection algorithm can be implemented with higher level of sophistication with built in heuristics to detect other cases of neutral pixels. One example would be that the gray pixels have equal CMY values. This logic can be further expanded with some type of mapping CMY value triplets that could be detected. In practice, equal CMY values do not generate a neutral output, so the input neutral pixels will not have equal CMY values. For copying, the gray pixel detection algorithm can be further qualified with some type of threshold bracket to account for the CYMK value variations due to the scanning process.

Figure 5:
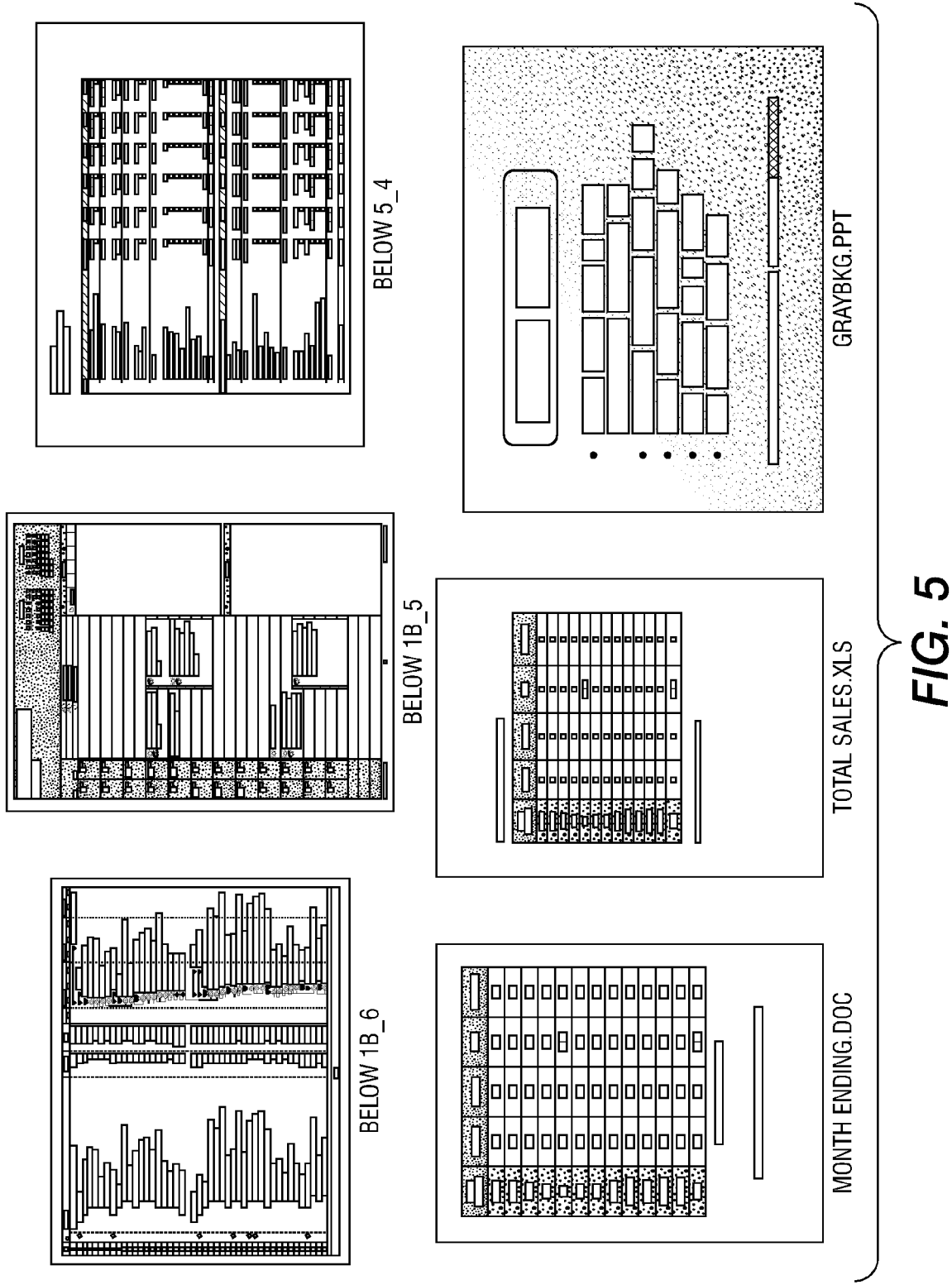
FIG. 5 illustrates a plurality of exemplary gray fields within images placed on a substrate, in accordance with an exemplary embodiment.

FIG. 5 illustrates several examples where gray pixels (gray fills, fields, and sweeps) are utilized. As described, the marking engine can convert true gray pixels to composite gray pixels and thus cause the marked color pixel count to be incorrect. For the case of a page that is truly black and white or gray, the entire page can be detected to be monochrome and a customer will be billed accordingly. However, with the tiered billing approach described herein, a customer's document with a bit of color is billed as monochrome. In this manner, when a quantity of color is added for the gray pixels to their original color pixels, the system 200 can sort out the true color pixels from gray pixels as described above.

FIG. 6 illustrates a comparison of a marked color pixel count with gray pixel removal to avoid falsely counting color pixels from composite K generation. As shown, the color pixel count is dramatically reduced to affect a change in billing that avoids billing a customer for pixels designated as monochrome even though composite marking was employed.

Figure 7:
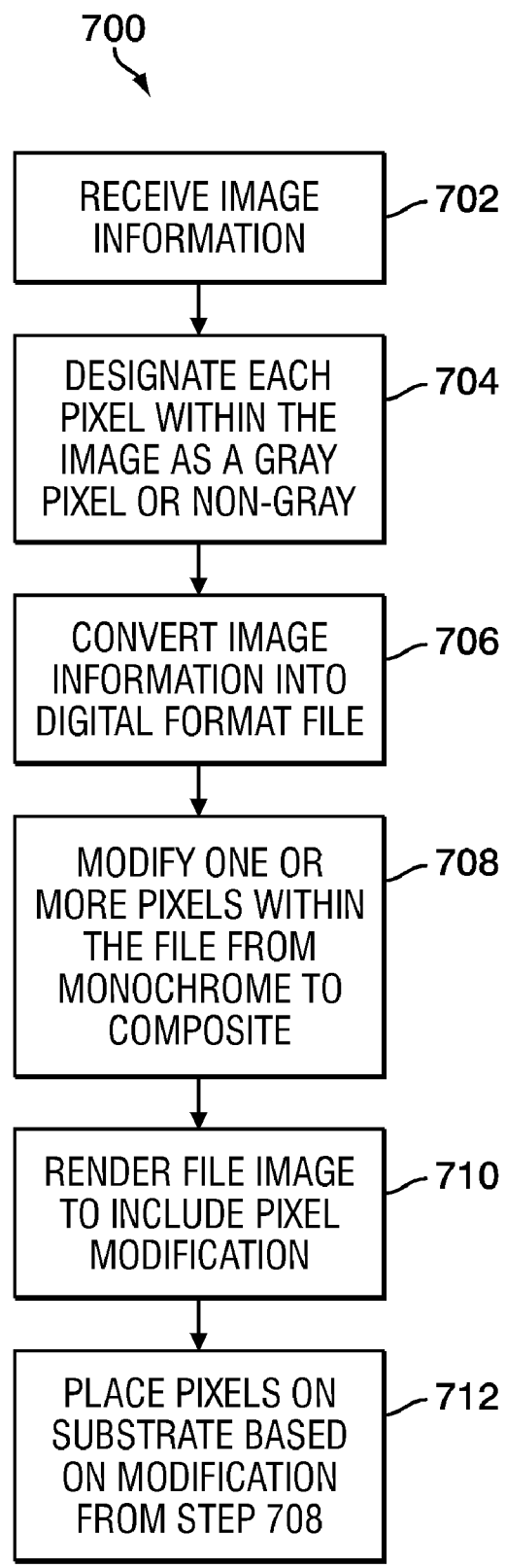
FIG. 7 is a method to place pixels on a substrate, in accordance with an exemplary embodiment.

FIG. 7 illustrates a methodology 700 to count gray pixels for billing purposes within a print job. At reference numeral 702, image information is received by an input component. At 704, each pixel within the image is designated as a gray or non-gray pixel. A gray designation refers to an expectation that a single predetermined color (e.g., black (K)) will be used to place the pixel on a substrate. A non-gray designation means there is no such expectation.

At 706, the image information is converted into a file that describes the image in a digital format, such as a bitmap. In one embodiment, this conversion can be performed via a PDL component. At 708, one or more pixels are modified from monochrome to composite. Monochrome refers to a single color, whereas composite refers to a plurality of colors to form and place each pixel on a substrate. Such modification can be performed by a marking engine to provide an enhanced output of the image. At 710, the image is rendered and at 712 the pixels are placed on a substrate based on the pixel modification in step 708.

Figure 8:
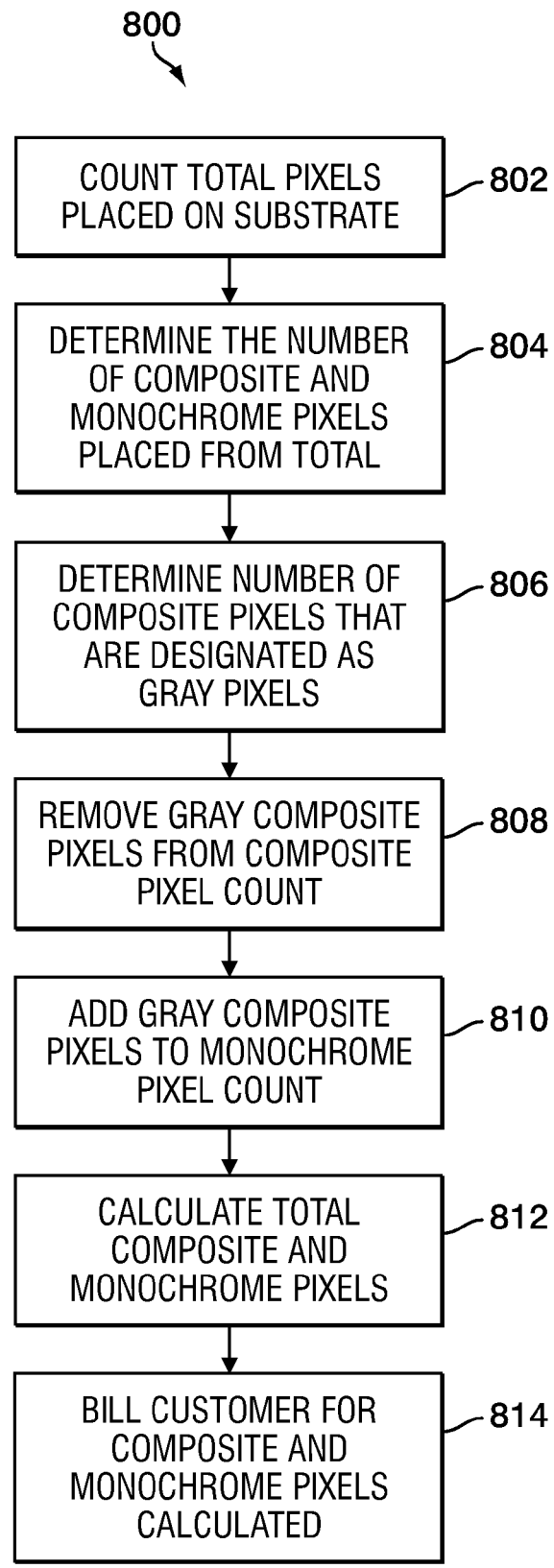
FIG. 8 is a method to identify and bill pixels placed on a substrate in view of customer expectation, in accordance with an exemplary embodiment.

FIG. 8 illustrates a methodology 800 that counts and bills a customer for pixels placed on a substrate in view of predetermined expectations. It is to be appreciated that this methodology can be continued subsequent to step 712 of FIG. 7. At reference numeral 802, a total number of pixels placed on a substrate are counted. At 804, the number of composite and monochrome pixels are determined from the total. At 806, the number of composite pixels that are designated as gray pixels is determined. The gray composite pixels are removed from the composite pixel count at 808. The gray composite pixels are added to the monochrome pixel count at 810.

At 812, the total number of composite and monochrome pixels are calculated. This calculation is not based on the pixels are they are placed on a substrate. Rather, this calculation is based on the pixels as placed in view of their gray pixel designation. At 814, a customer is billed for each composite and monochrome pixel as calculated in step 812.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system including a non-transitory computer readable media adapted to calculate appropriate billing within an imaging pipeline, comprising:
   an input component that receives an image that is described as a plurality of
   pixels;
   a driver including a Page Description Language (PDL) component that receives the image and determines a location, a color and a gray-pixel designation for each of the one or more pixels;
   a marking engine modifies the one or more pixels with the gray-pixel designation and places each of the one or more pixels as a monochrome or a composite pixel on a substrate, the modification includes placing cyan, magenta, yellow (CMY) color rather than a predetermined black at the designated gray-pixels;
   a processor including an analysis component that counts the number of monochrome and composite pixels placed on the substrate by the marking engine, the number of composite pixels that include a designation are counted as monochrome; and a processor including a billing component that calculates the cost for placing each of the monochrome and the composite pixels counted by the analysis component, the billing component removing the designated gray pixels from a calculation for composite pixels.

2. The system according to claim 1, further including:

a raster image processing component that produces a raster image based on information from the PDL component that is independent of the type of marking engine.

3. The system according to claim 2, further including:

a color correction component evaluates color pixel placement and modifies color and placement of pixels based on at least one of a dye combination, an absorption spectra and one or more empirical parameters of the image.

4. The system according to claim 2, further including:

a halftoning component that determines which pixels to turn on and off based at least in part upon one or more empirical parameters of the image.

5. The system according to claim 2, further including:

a digital front end organizes and manipulates the image data from the raster image processor for communication to the marking engine.

6. The system according to claim 1, further including:

a print driver that communicates image data from the input component to the PDL component.

7. The system according to claim 1, wherein the designation identifies an expectation that the pixel is to be marked utilizing a single color.

8. The system according to claim 7, wherein the single color is black and the designation is a gray pixel.

9. The system according to claim 1, wherein the monochrome pixels are placed with only a black ink and the composite pixels are placed utilizing two or more of a cyan, a magenta, a yellow and a black ink.

10. The system according to claim 1, wherein the marking engine is at least one of a copier, an imagesetter, a digital press, a toner based printer, a liquid ink jet printer, a solid ink printer, a dye sublimation printer, and an inkless printer.

11. The system according to claim 1, wherein the image data is received as a plurality of contone cyan (C), magenta (M), yellow (Y), and black (K) pixels and rendered as a plurality of binary pixels for placement on a substrate.

12. A non-transitory computer readable media adapted to perform a method to accurately bill a customer for a print job, comprising:

counting a total number of pixels placed on a substrate;

determining the number of composite and monochrome pixels placed from the total number counted;

determining a number of composite pixels that are designated as gray pixels;

removing the gray composite pixels from the determined number of composite pixels;

adding the gray composite pixels to the determined number of monochrome pixels;

calculating the total number of composite and monochrome pixels; and billing a customer for the composite and monochrome pixels calculated, the billing comprising removing the gray composite pixels from a calculation of composite pixels.

13. The method according to claim 12, wherein the monochrome pixels are placed with only a black ink and the composite pixels are placed utilizing two or more of a cyan, a magenta, a yellow and a black ink.

14. The method according to claim 12, wherein a pixel has a binary value of 1 or 0 is assigned to each of a cyan, a magenta, a yellow and a black color.

15. The method according to claim 14, wherein the binary value is 0 for each of the cyan, the yellow and the magenta for gray pixels.

* * * * *